(12) United States Patent
Pan et al.

(10) Patent No.: US 10,741,105 B2
(45) Date of Patent: Aug. 11, 2020

(54) WIRELESS IMAGE PROCESSING SYSTEM

(71) Applicants: Ji Pan, Dallas, TX (US); Huang Ming, Beijing (CN)

(72) Inventors: Ji Pan, Dallas, TX (US); Huang Ming, Beijing (CN)

(73) Assignee: olighto Inc., Dallas, TX (US)

( * ) Notice: Subject to any disclaimer, the term of this patent is extended or adjusted under 35 U.S.C. 154(b) by 0 days.

(21) Appl. No.: 16/231,585

(22) Filed: Dec. 23, 2018

(65) Prior Publication Data

US 2019/0130797 A1 May 2, 2019

Related U.S. Application Data

(63) Continuation-in-part of application No. 15/590,285, filed on May 9, 2017, now Pat. No. 10,161,607, which is a continuation-in-part of application No. 15/184,719, filed on Jun. 16, 2016, now abandoned, which is a continuation-in-part of application No. 15/019,823, filed on Feb. 9, 2016, now Pat. No. 9,746,164.

(51) Int. Cl.
*G09F 9/302* (2006.01)
*G09G 3/32* (2016.01)
*H04N 7/14* (2006.01)
*G06F 3/14* (2006.01)

(52) U.S. Cl.
CPC .......... *G09F 9/3026* (2013.01); *G06F 3/1446* (2013.01); *G09G 3/32* (2013.01); *H04N 7/147* (2013.01); *G09G 2300/026* (2013.01); *G09G 2370/16* (2013.01)

(58) Field of Classification Search
CPC ..... G09F 9/3026; G06F 3/1446; H04N 7/147; G09G 3/32; G09G 2370/16; G09G 2300/026
See application file for complete search history.

(56) References Cited

U.S. PATENT DOCUMENTS

| 2006/0107616 A1* | 5/2006 | Ratti | E04B 1/00 52/750 |
| 2010/0306688 A1* | 12/2010 | Cho | G06F 3/0346 715/768 |
| 2012/0105424 A1* | 5/2012 | Lee | G09F 9/35 345/212 |

* cited by examiner

*Primary Examiner* — Aneeta Yodichkas
(74) *Attorney, Agent, or Firm* — Kirby Drake

(57) ABSTRACT

A wireless image processing system includes a splitter software and processing apparatus configured to receive or forward picture element data. Image data in a computer may be split, wirelessly transmitted, and processed to form an any size integrity image/video display on a building or structure, meanwhile no physical damage may be done on or to the building or no physical cabling obstacle for image or video dividing and combining at a lighting show.

14 Claims, 17 Drawing Sheets

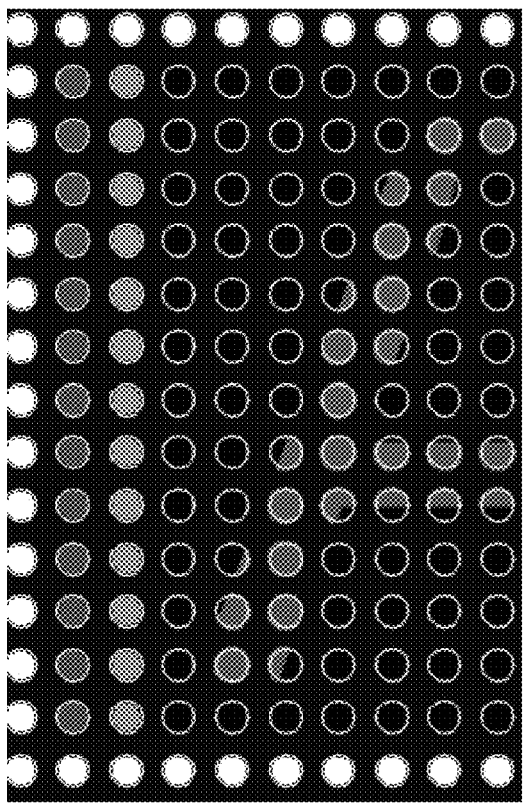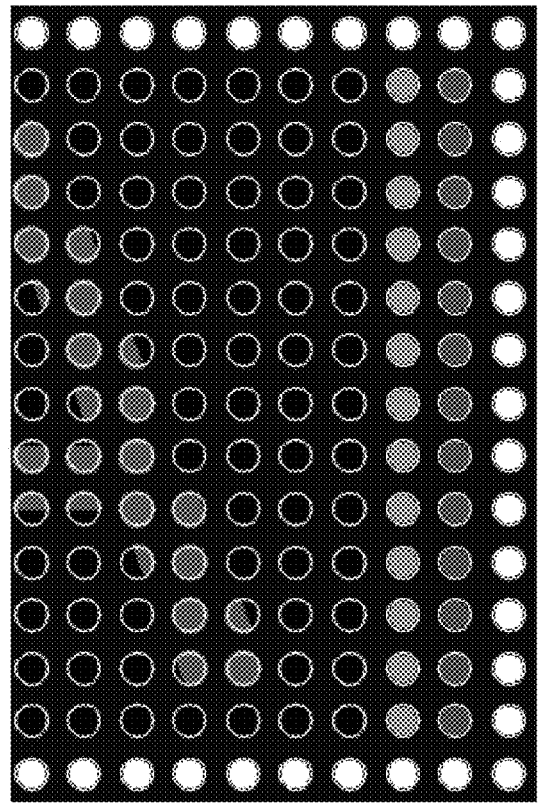
FIG. 15

WIRELESS IMAGE PROCESSING SYSTEM

CROSS-REFERENCE TO RELATED APPLICATIONS

This application is a continuation-in-part of U.S. application Ser. No. 15/590,285 filed May 9, 2017 entitled "SUCTION LIGHTING SYSTEM AND METHOD" which is a continuation-in-part of U.S. application Ser. No. 15/019,823 filed Feb. 9, 2016, entitled "SUCTION LIGHTING SYSTEM," and U.S. application Ser. No. 15/184,719 filed Jun. 6, 2016, entitled "A MODULAR LIGHT SYSTEM ON A SMOOTH SURFACE," all of which are incorporated herein by reference in their entirety.

FIELD OF THE DISCLOSURE

The present disclosure relates generally to splitting, forming, and displaying an image or video on a structure through wireless data communication between the processing apparatus.

BACKGROUND

Lighting systems are well known in the art and can be effective means of advertising or decorating information or creating artistic displays. Conventional lighting and advertising systems including, but not limited to, digital billboards and wallscapes may not be installed without causing damage to a structure where they are installed. These conventional lighting systems can be an investment that may not provide a return on the investment and can be expensive to install and maintain. Poor weather conditions can damage conventional lighting systems, and limited size can make it difficult to see images and/or video from a distance. Distortion of building architecture can negatively impact a city's skyline or scene and may not be suitable for preserving a historical building when using conventional lighting systems. Accordingly, conventional lighting systems can provide several shortcomings.

Currently, LED video-display boards have similar but proprietary architectures using LED video bricks of different color pixel sizes. The video bricks can be put next to each other to assemble a video wall of a few meters in size on each side (FIG. 1). LEDs and their drivers are mounted close to each other on different printed circuit boards (PCBs) inside of each video brick. LED-driver PCBs also include a field programmable gate array (FPGA) and video-buffer memory chips.

For a video wall, interconnections between video bricks are normally made using coaxial cables. The video wall is then linked to control and video processing units by optical fiber. The control unit is used to configure these video bricks and select the proper video source. The video processor receives the selected video signal, converts its format, and sends the correct data information to the corresponding pixel position. The video processor also may perform data buffering and scaling.

One of the problems commonly associated with the system in FIG. 1 on building structures is that each room and each floor must be perforated for a wired cable to achieve data connection. Another problem is that the displayed area is limited by the attenuation of the connecting cable (i.e., the distance is large, the signal attenuation causes the display pattern to be out of sync or not displayed). The main controller and sub-processing controllers must be connected by cable wire to form an image/video. After the position of the main controller is determined, it cannot be arbitrarily changed to other controllers. Each sub-controller accepts all display content (large amount of data) to transmit and display each element picture of an image. The sub-controller can only transmit data sequentially but cannot implement data forwarding function like the router.

SUMMARY

Embodiments of the present disclosure may provide a wireless processing system for image/video splitting, formation, and display on a structure. It should be appreciated that data transmission between processing apparatus may be through wireless broadcast while not perforating a wall and causing no physical damage to a building wall or floor. It should be appreciated that dividing and combining an image or video can be achieved without presenting a physical cabling obstacle. Each processing apparatus may be can be configured as a master or slave processor. It should be appreciated that manufacturing, installation, and maintenance can be done effectively because each processing apparatus may be made uniformly. Each apparatus can be configured to perform different functions, such as receiving data and forwarding data to one or more apparatus at the same time. The master processing apparatus can be configured arbitrarily. It should be appreciated that the flexibility of configuration may make the operation and installation of a display easier. Each processing apparatus only accepts the content data corresponding one picture element of image or video for display. It should be appreciated that the smaller data content can be wirelessly transmitted and saved to the internal memory of the apparatus (such as the built-in memory card). A clock signal may be broadcast by the master processor, and the clock of each slave processor may be synchronized for the display content element of each apparatus to ensure the integrity of an image or video. In embodiments of the present disclosure, an unlimited number of processing apparatus can be connected by wireless broadcast depending on the size of a display on a structure. It should be appreciated that the entire building size façade can be easily achieved in embodiments of the present disclosure. It should be appreciated that dividing and combining an image or video at a lighting show may be achieved without presenting a physical cabling obstacle in embodiments of the present disclosure.

Embodiments of the present disclosure may provide a suction lighting system that may be arranged to form an advertisement or a decorative façade on a structure. At least one set of suction light devices may include a plurality of suction cups that may be provided to removably attach to an available space on the structure. The plurality of suction cups may be attached in an available space on the structure. The at least one set of suction light devices may include a plurality of optical lenses that may be arranged within the lighting system. The at least one set of suction light devices may further include a plurality of light emitting diodes (LEDs) that may be provided to emit light from the lighting system. A plurality of lines may be connected to a plurality of printed circuit boards (PCBs), and the plurality of lines may include an anode line, a data line, and a cathode line. A plurality of drive chips may be provided to drive each of the plurality of PCBs. The plurality of optical lens may be attached to each of the plurality of suction cups. Further, the plurality of optical lenses may be attached to each of the plurality of PCBs. The system may provide an LED strip that may support the plurality of suction cups. The LED strip may include a metal wire that may be provided to bend the LED strip in different shapes and directions. At least one installation frame may be provided to secure any number of the plurality of suction cups, and the at least one installation frame may be movable in different directions. A reflective material may be secured to an inner portion of each of the plurality of suction cups, and the inner portion may engage with the structure. A tinted material may be secured to an inner portion of each of the plurality of suction cups, and the inner portion may engage with the structure. A power source may be connected to the system. A signal receiving device may be configured to receive a wireless signal and to send the wireless signal to the at least one set of suction light devices. A plurality of sets of the suction light devices may be connected wirelessly without cables or wires.

Other embodiments of the present disclosure may provide a suction cup that may be arranged to form an advertisement or decorative façade on a structure. The suction cup may include an optical lens that may be connected to the suction cup. One or more LEDs may be provided to emit light from the suction cup. A plurality of lines may be connected to at least one printed circuit board (PCB). The plurality of lines may include an anode line, a data line, and a cathode line. At least one drive chip may be provided and drive at least one PCB. An LED strip may be attached to the structure and may be provided to support the suction cup. The LED strip may include a metal wire that may be provided to bend the LED strip in different shapes and directions, and the LED strip may be attached to the structure. Optical lens may be arranged within the suction cup. The optical lens may be attached to at least one PCB. A signal receiving device may be configured to receive a wireless signal and send the wireless signal to provide light to the advertisement or the decorative façade on the structure. At least one installation frame may be provided to secure the suction cup. The at least one installation frame may be movable in different directions. A reflective material secured to an inner portion of the suction cup. The inner portion may engage with a surface upon which the suction cup may be applied.

Further embodiments of the present disclosure may provide a method of advertising or decorative facade on a structure. The method may provide searching, by a processor, one or more available structures for an advertisement or a decorative façade to be displayed on the one or more available structures. A user may initiate the method of advertising on the structure by searching the one or more available structures. The method may include displaying, by the processor, the one or more available structures to a user. The user may select at least one or more available structures to install a set of suction light devices that may form the advertisement or the decorative facade. The user may reserve, by the processor, the one or more available structures for the user to display the advertisement or the decorative façade. The location to install the set of suction light devices may be reserved, by the processor. The set of suction light devices may be installed at the location that may be selected by the user to display the advertisement or the decorative façade. A picture, a video, or a combination thereof of the set of suction light devices that may form the advertisement or decorative façade when installed on the at least one of the one or more available structures may be captured by an audience that may utilize a mobile device. The picture, the video, or the combination thereof of the advertisement or the decorative facade may be shared online. The advertisement or the decorative facade may be tracked, and a tracking code may be implanted in the picture, the video, or the combination thereof. The tracking code may collect information that may corresponding to the audience. The method may provide collecting data that may correspond to the advertisement or the decorative facade by utilizing the tracking code and may build a database of the collected data. The method may provide filtering the database, by the processor, to generate sets of information that may correspond to the audience.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which:

FIG. 15 depicts a top view of sets of suction light devices without a cable connection according to an embodiment of the present disclosure;

DETAILED DESCRIPTION

Embodiments of the present disclosure may provide systems that may include a plurality of removable suction lighting devices. Further embodiments of the present disclosure may provide installing and tracking a lighting system formed of removable suction lighting devices.

Figure 1:
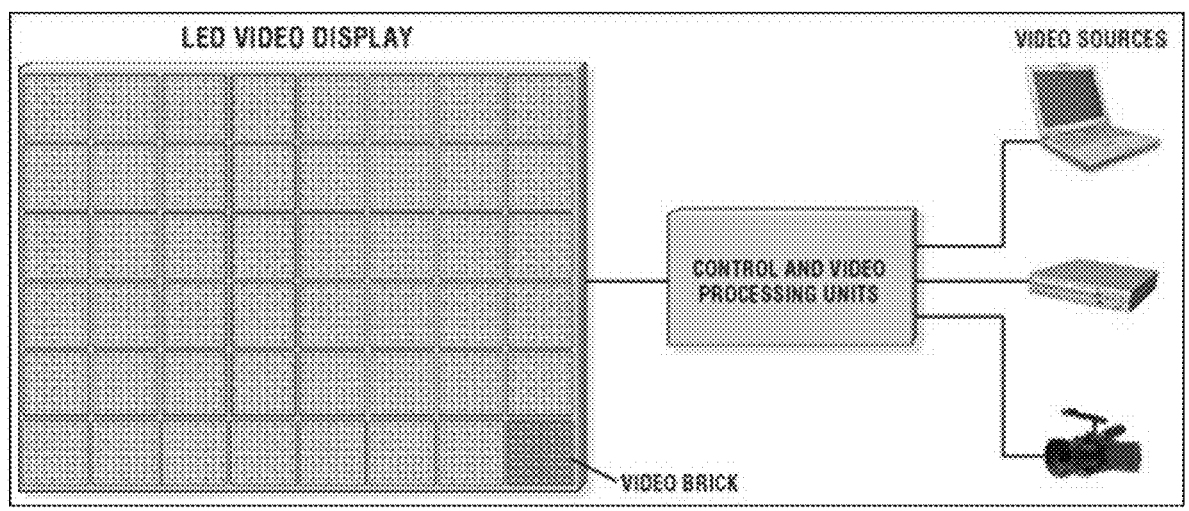
FIG. 1 depicts a video display board configuration according to the prior art.
Figure 2:
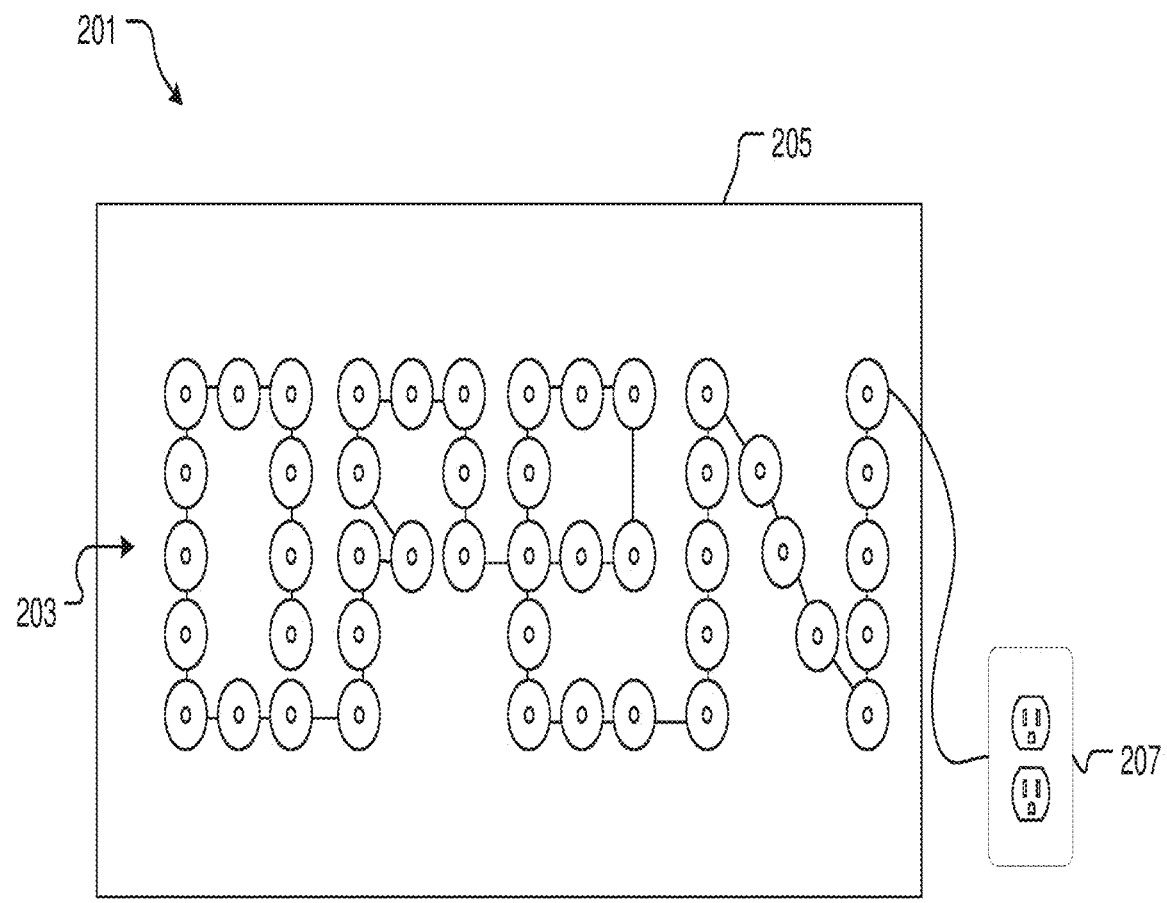
FIG. 2 depicts a front view of a suction lighting system according to an embodiment of the present disclosure.

As shown in FIG. 2, according to an embodiment of the present disclosure, a front view of suction light system 201 may include one or more suction light devices 203, one or more smooth surfaces 205, and one or more sources of electricity 207. When in use, suction light devices 203 may be attached to smooth surface 205 via a vacuum that may be created by suction light devices 203 and may then be connected to source of electricity 207 in order to power a light display. It should be appreciated that each suction light device 203 may individually adhere to smooth surface 205 and may allow infinite varieties of displays to be created. It should be appreciated that individual components or individual suction light devices 203 may be mechanically reconfigured and may form different patterns and/or shapes. Suction light devices 203 may provide interior lighting from the inside of a building that may provide pictorial and/or video advertising that may be displayed inside and/or outside of the building or structure. Suction light devices 203 may be attached, adhered, and/or sucked onto smooth surface 205 from an interior of a building. It should be appreciated that smooth surface 205 may include, but is not limited to, a glass window, transparent structure, and a glass door. Suction light devices 203 may be attached to smooth surface 205 by applying pressure on suction cup 603, 703, 1003, 2003, 3010, 4010 (FIGS. 6-7, 10-11, and 12-13, respectively) against smooth surface 205. It should be appreciated that suction light devices 203 may be configured in the form of a sign. It should be appreciated that a sign may include, but is not limited to, an outdoor structure, sign, display, light device, figure, painting, drawing, message, plaque, poster, billboard, or another device that is designed, intended, or utilized to advertise or inform individuals.

Figure 3:
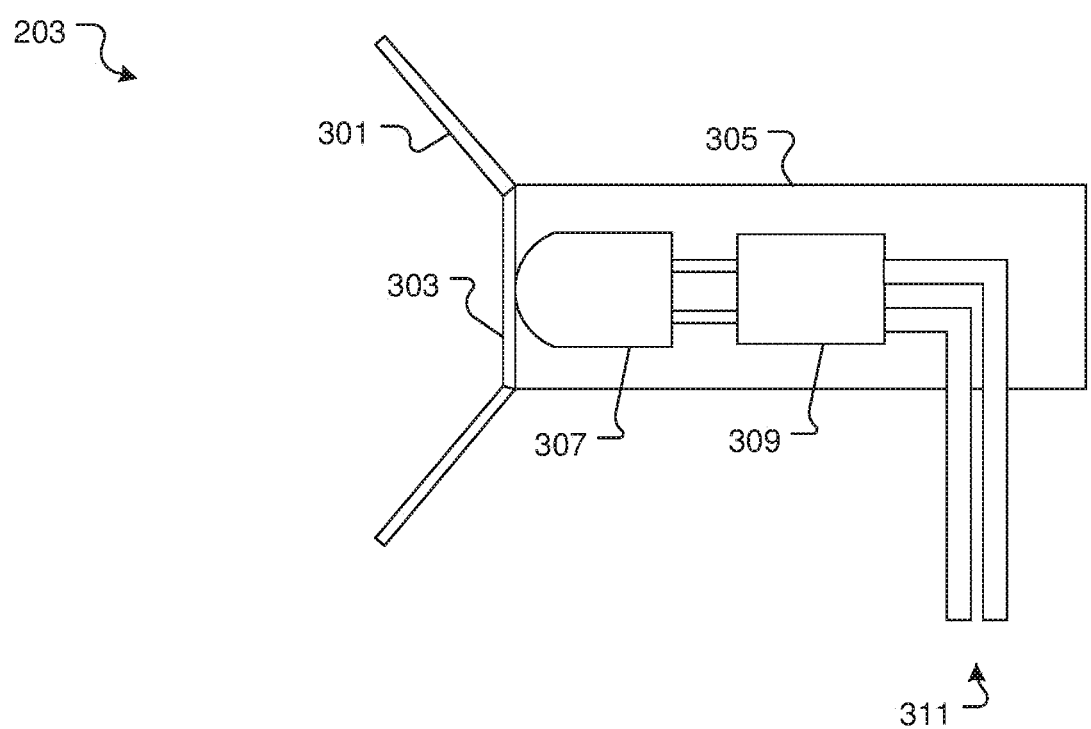
FIG. 3 depicts a sectional side view of the suction light of FIG. 2 according to an embodiment of the present disclosure.

As shown in FIG. 3, according to an embodiment of the present disclosure, suction light device 203 may include one or more suction means 301 that may have transparent center 303, housing 305, and one or more light sources 307 that may be in electronic communication with signal receiving device 309 that may be in electronic communication with power input means 311. It should be appreciated that suction means 301 may be a suction cup or any other device arranged to attach a light to a surface via suction without departing from the present disclosure. It should be appreciated that signal receiving device 309 may receive signals that may change any aspect of the light produced by light source 307.

Figure 4:
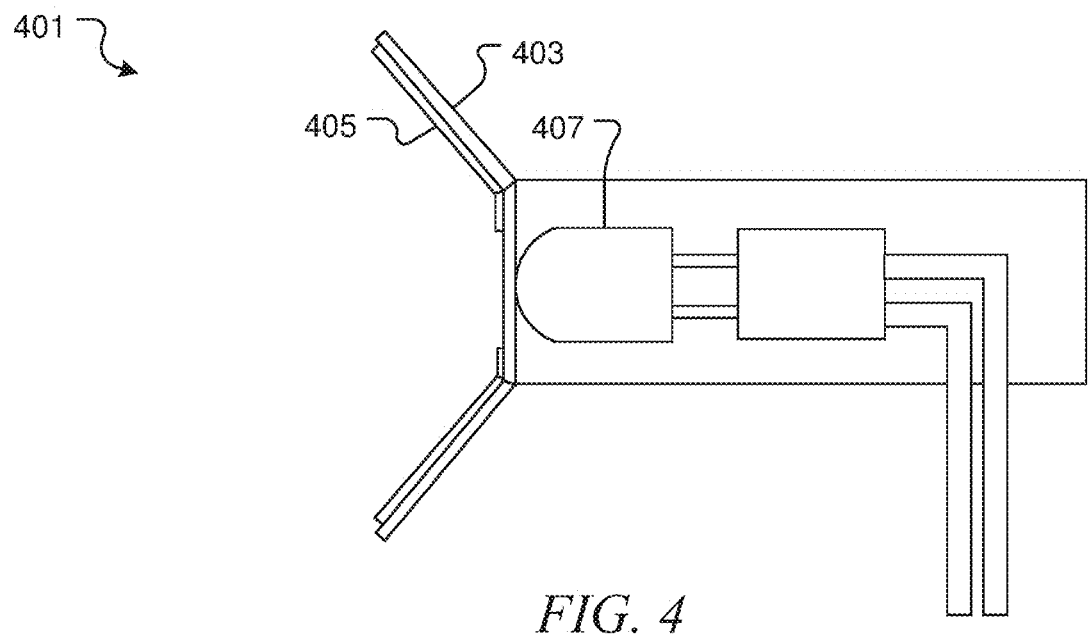
FIG. 4 depicts a sectional side view of the suction light of FIG. 2 according to an embodiment of the present disclosure.

As shown in FIG. 4, according to an embodiment of the present disclosure, suction light device 401 may provide suction means 403 that may be lined with reflective material 405. It should be appreciated that reflective material 405 may increase the perceived intensity or brightness of light source 407 in some embodiments of the present disclosure.

Figure 5:
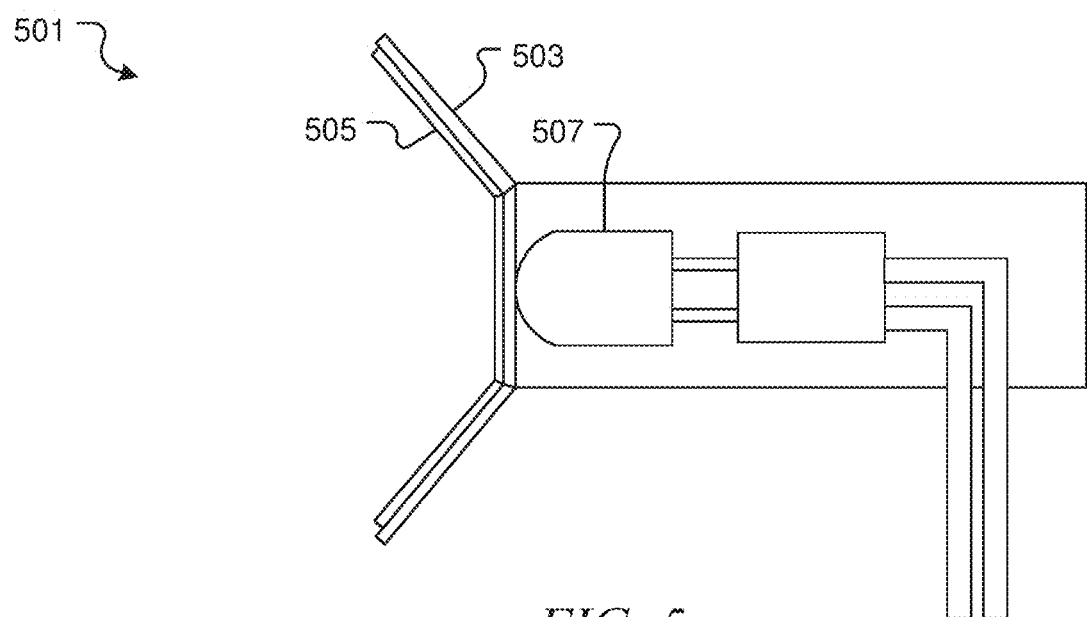
FIG. 5 depicts a sectional side view of a suction light of FIG. 2 according to an embodiment of the present disclosure.

As shown in FIG. 5, according to an embodiment of the present disclosure, suction light device 501 may provide suction means 503 which may be lined with tinted material 505. It should be appreciated that tinted material 505 may modify the color of the light from light source 507. It should also be appreciated that a lens of any type or tint may be applied to focus or disperse the light and/or to change the color of the light according to embodiments of the present disclosure.

Figure 6:
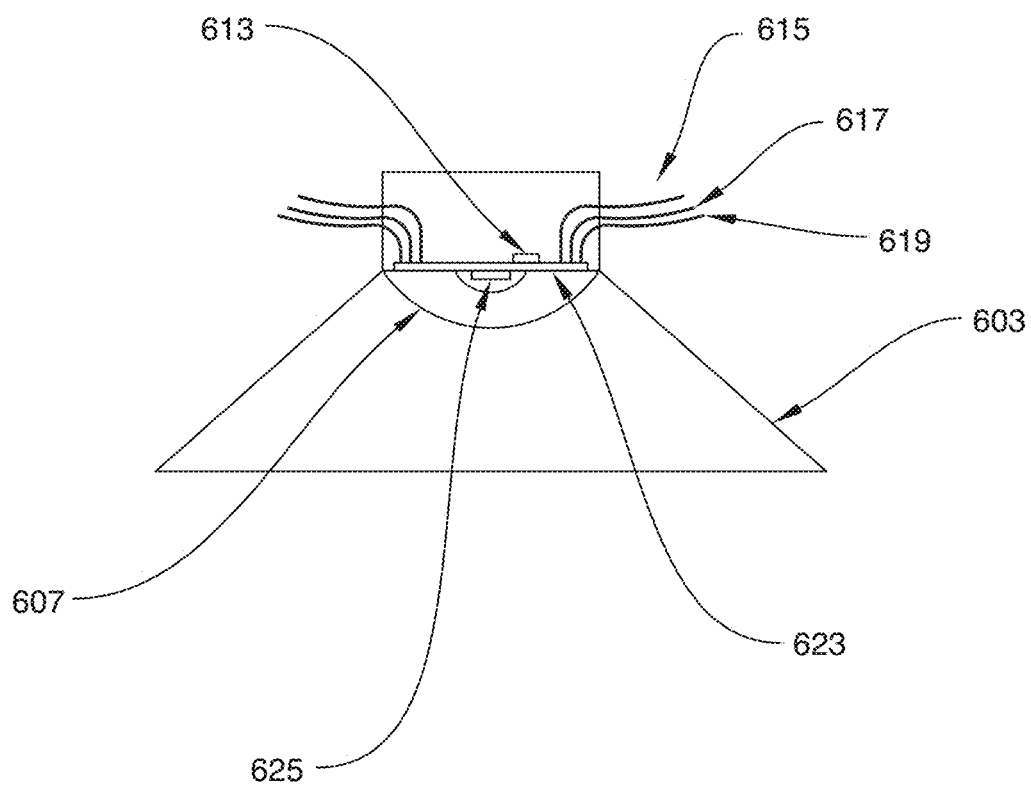
FIG. 6 depicts a side view of a suction light device including an optical lens provided in a suction cup according to an embodiment of the present disclosure.

As shown in FIG. 6, according to an embodiment of the present disclosure, suction light device 601 may include suction cup 603 which may provide built-in optical lens 607. Optical lens 607 may provide at least one LED 625 which may be in the form of a surface-mounted device LED and/or an LED chip. Suction cup 603 may further provide printed circuit board (PCB) 623 that may be attached to suction cup 603 and may include drive chip 613, anode line 615, data line 617, and/or cathode line 619. PCB 623 may drive at least one LED 625 to emit light in embodiments of the present disclosure. It should be appreciated that LEDs may be controlled digitally without departing from the present disclosure.

Figure 7:
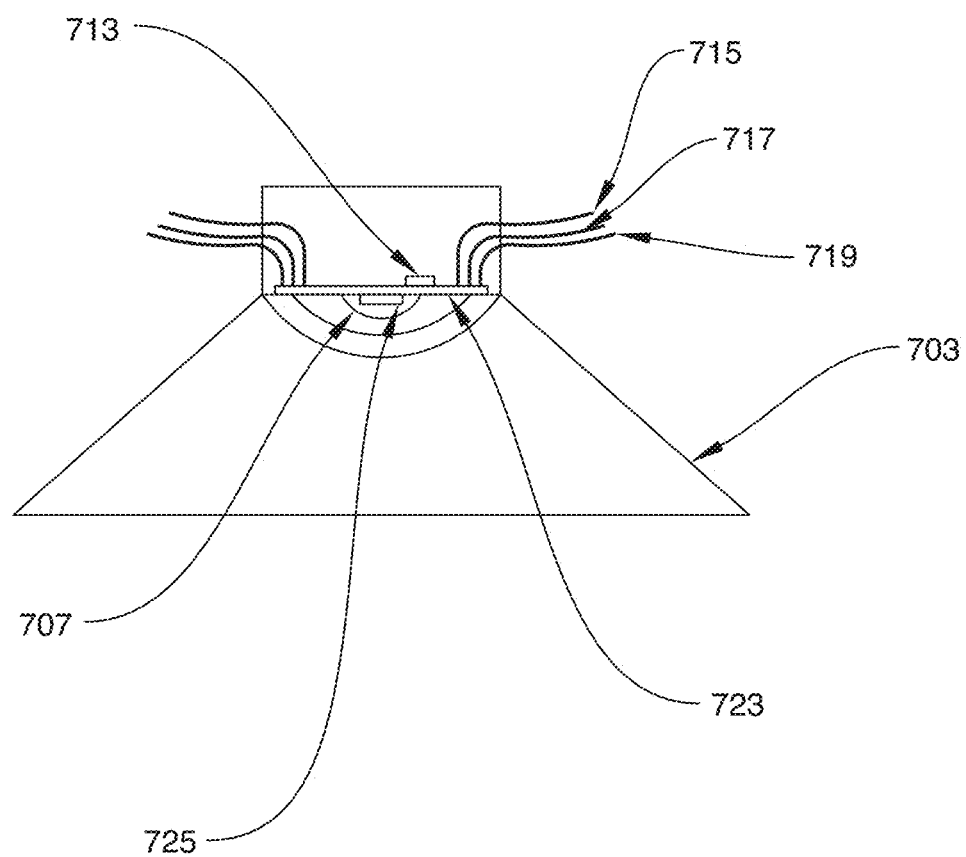
FIG. 7 depicts a side view of a suction light device including an optical lens provided on a printed circuit board (PCB) according to an embodiment of the present disclosure.

As shown in FIG. 7, according to an embodiment of the present disclosure, suction light device 701 may include suction cup 703. Suction cup 703 may provide PCB 723 which may include drive chip 713, anode line 715, data line 717, and/or cathode line 719. Optical lens 707 may be built into PCB 723, and optical lens 707 may provide at least one LED 725 which may be in the form of a surface-mounted device LED and/or an LED chip. PCB 723 may drive at least one LED 725 to emit light according to embodiments of the present disclosure. It should be appreciated that LEDs may be controlled digitally without departing from the present disclosure.

Figure 8:
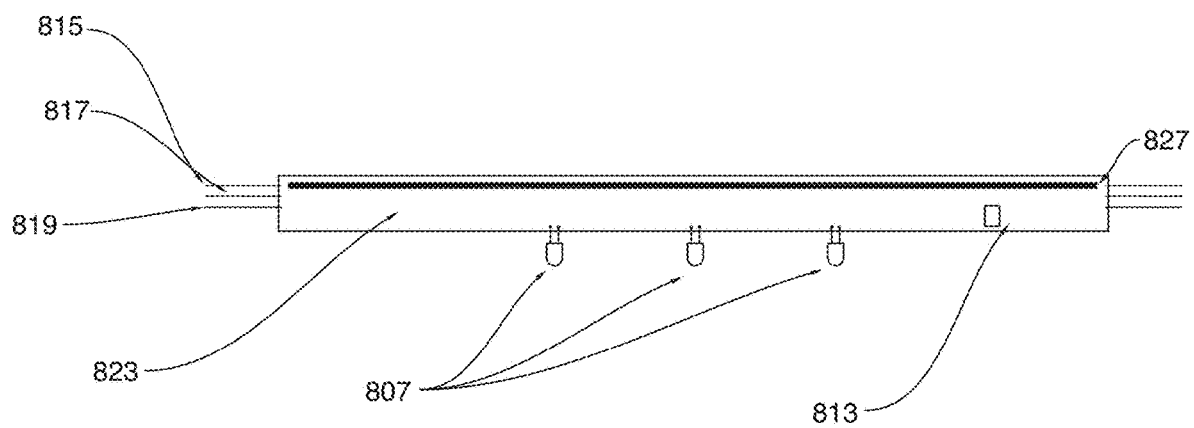
FIG. 8 depicts a side view of a light emitting diode (LED) strip according to an embodiment of the present disclosure.

As shown in FIG. 8, according to an embodiment of the present disclosure, LED strip 800 may provide a plurality of LEDs 807 and drive chip 813. PCB 823 may provide a flexible printed circuit and may include anode line 815, data line 817, and cathode line 819. Metal wire 827 may be provided in LED strip 800 and may be crafted to bend and provide pliability for the plurality of LEDs 807 in embodiments of the present disclosure. It should be appreciated that LEDs may be controlled digitally without departing from the present disclosure.

Figure 9:
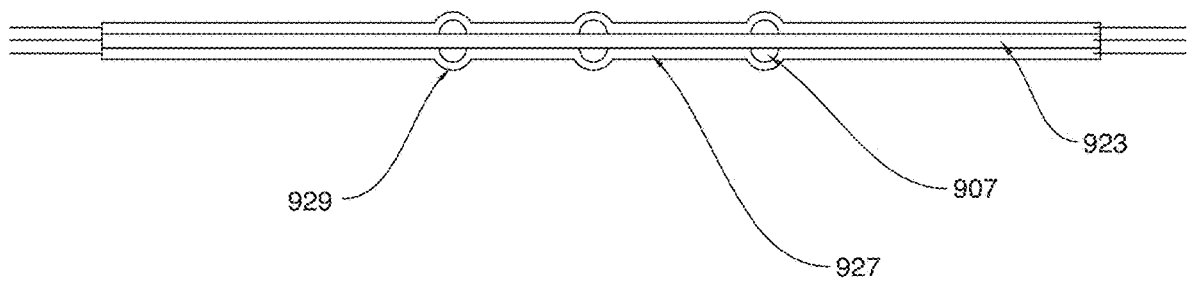
FIG. 9 depicts a top view of an LED strip according to an embodiment of the present disclosure.

As shown in FIG. 9, according to an embodiment of the present disclosure, LED strip 900 may provide a plurality of LEDs 907. LED strip 900 may include PCB 923 which may provide a flexible printed circuit. Silicon case 927 and/or half-round silicon case 929 may be provided on LED strip 900 and may support the plurality of LEDs 907. It should be appreciated that a metal wire may be provided in LED strip 900 and may be crafted to bend and provide pliability without departing from the present disclosure. It should be appreciated that LEDs may be controlled digitally without departing from the present disclosure.

Figure 10:
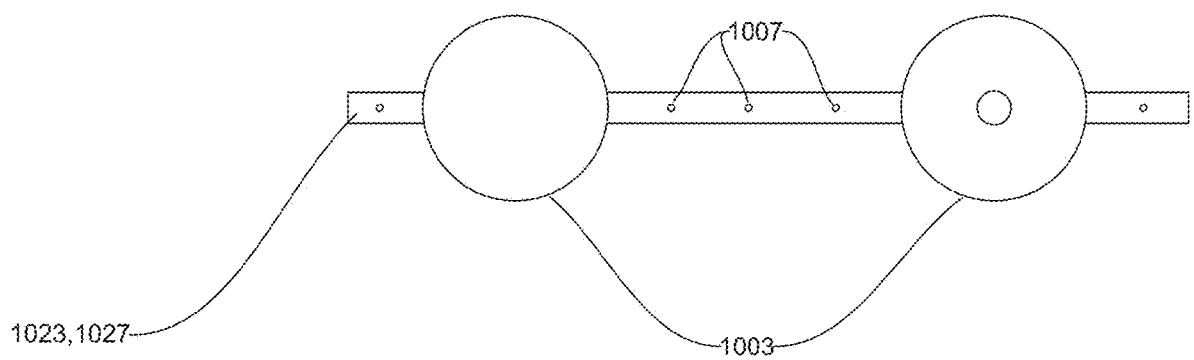
FIG. 10 depicts a top view of an LED strip including built-in suction cups according to an embodiment of the present disclosure.

As shown in FIG. 10, according to an embodiment of the present disclosure, at least one suction cup 1003 may be built into LED strip 1000. At least one LED 1007 may be provided along LED strip 1000. LED strip 1000 may provide PCB 1023 which may provide a flexible printed circuit silicon case 1027. It should be appreciated that any number of LEDs may be provided along LED strip 1000 without departing from the present disclosure. It should be appreciated that LEDs may be controlled digitally without departing from the present disclosure.

Figure 11:
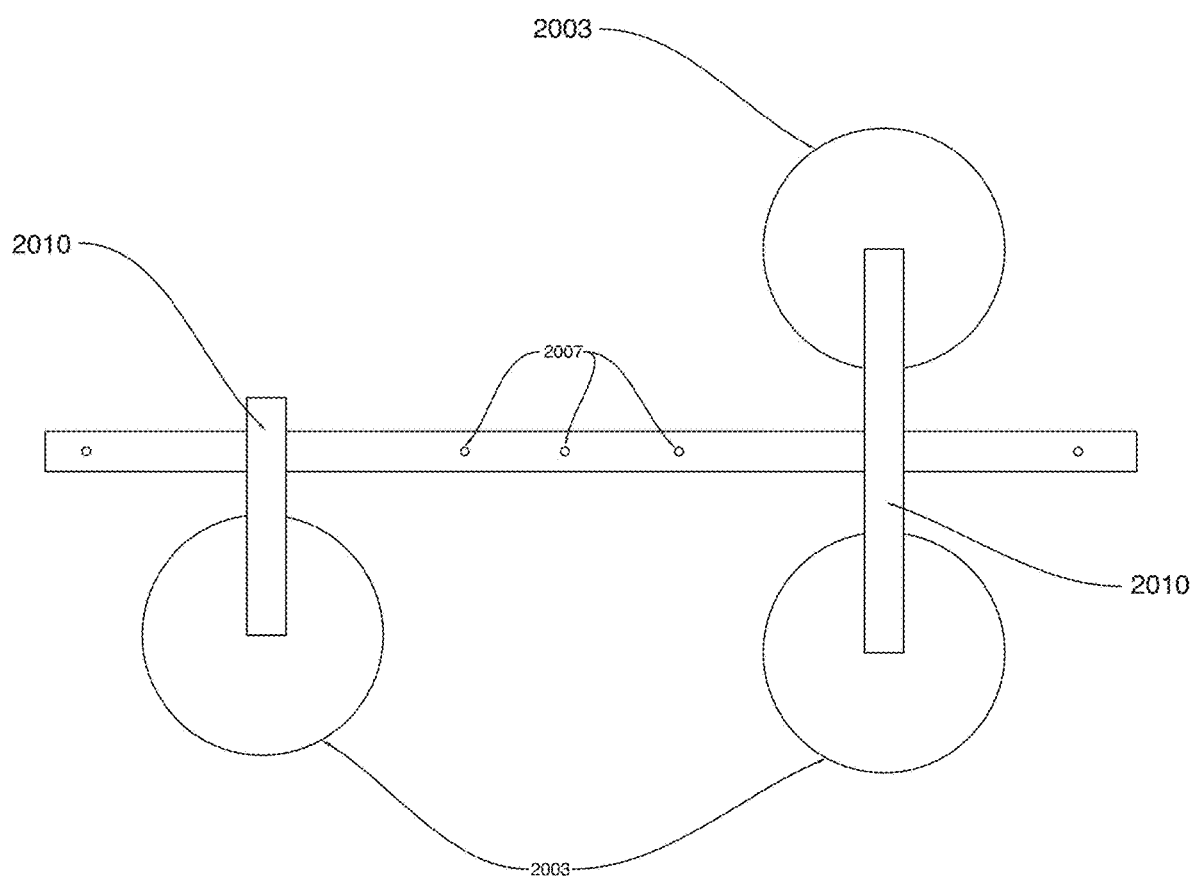
FIG. 11 depicts a top view of an LED strip including installation frames according to an embodiment of the present disclosure.

As shown in FIG. 11, according to an embodiment of the present disclosure, at least one suction cup 2003 may be built onto or affixed to LED strip 2000. At least one LED 2007 may be provided along LED strip 2000. LED strip 2000 may provide at least one installation frame 2010 that may be provided to extend from LED strip 2000. It should be appreciated that LEDs may be controlled digitally without departing from the present disclosure.

Figure 12:
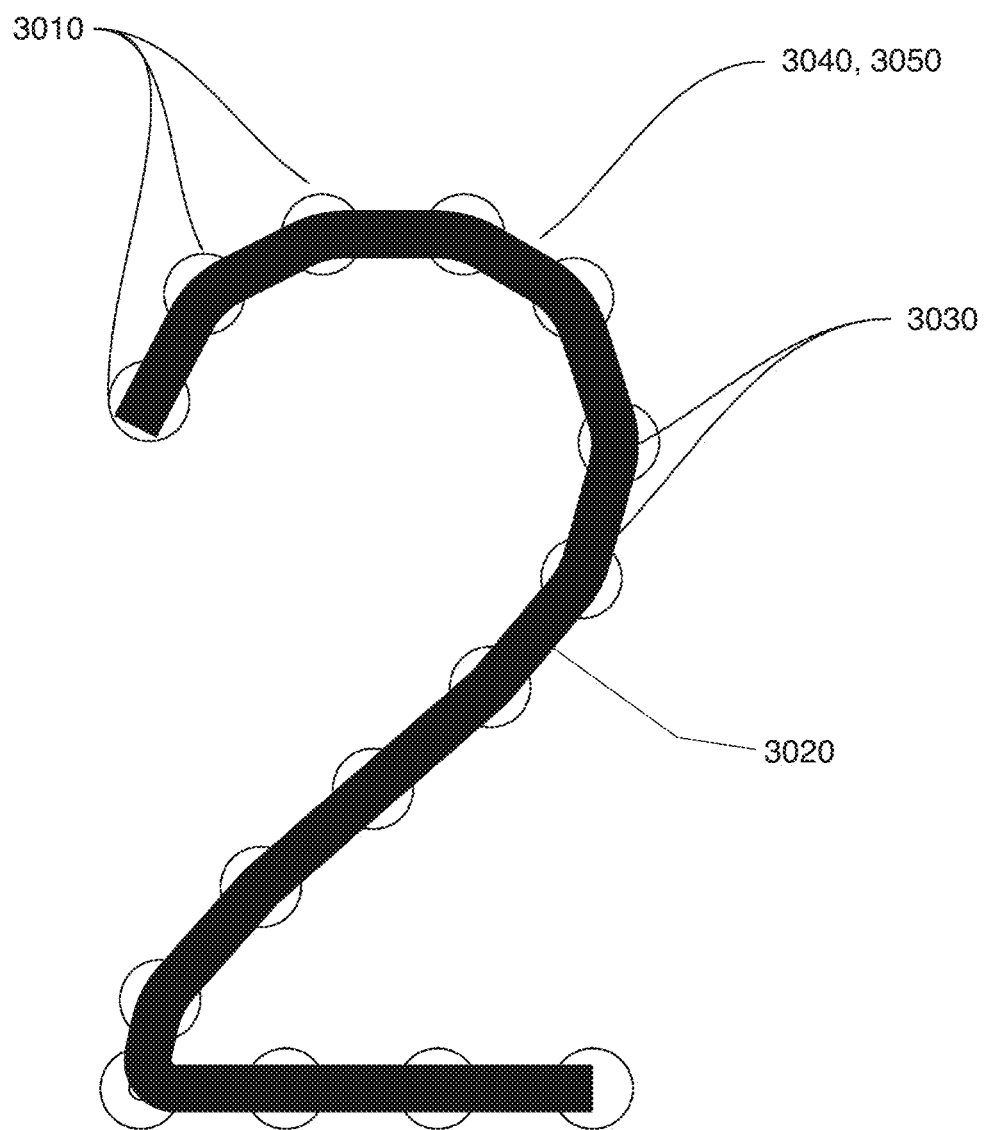
FIG. 12 depicts a top view of a pixel dot formation according to an embodiment of the present disclosure.

As shown in FIG. 12, according to an embodiment of the present disclosure, pixel dot formation 3000 may form a picture or video. Pixel dot formation 3000 may include a plurality of suction cups 3010 that may be arranged along LED strip 3020. LED strip 3020 may support a plurality of LEDs 3030 and PCB 3040. PCB 3040 may provide a flexible printed circuit and silicon case 3050. It should be appreciated that LEDs may be controlled digitally without departing from the present disclosure.

Figure 13:
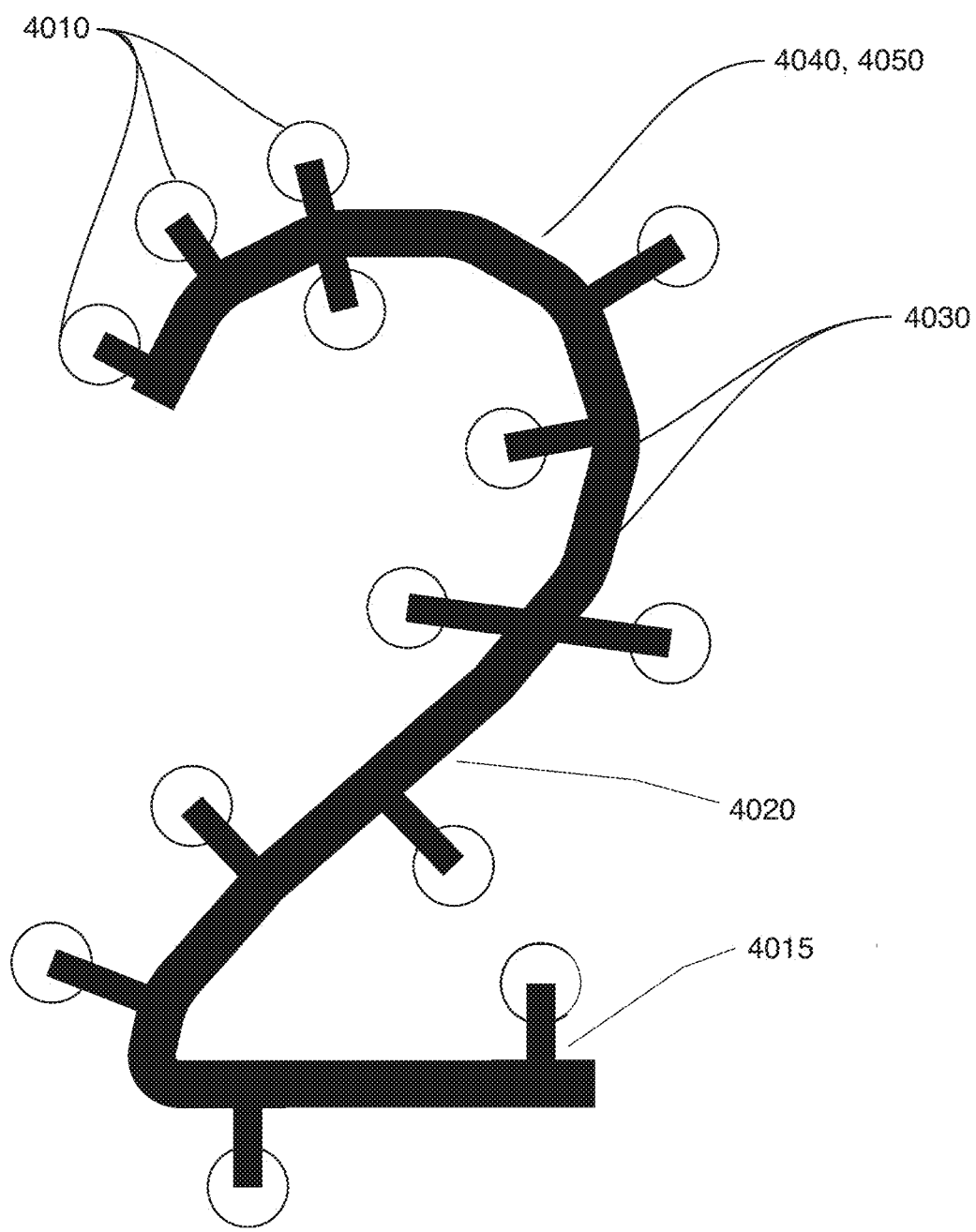
FIG. 13 depicts a top view of a fixed pixel dot or strip secured by attached or detached suction cup formation according to an embodiment of the present disclosure.

As shown in FIG. 13, according to an embodiment of the present disclosure, fixed pixel dot formation 4000 may be secured to a surface by utilizing a plurality of suction cups 4010 that may be attached to installation frames 4015. Installation frames 4015 may extend from LED strip 4020. Fixed pixel dot formation 4000 may provide LED strip 4020 that may support a plurality of LEDs 4030 and PCB 4040. PCB 4040 may provide a flexible printed circuit and silicon case 4050. It should be appreciated that LEDs may be controlled digitally without departing from the present disclosure.

Figure 14:
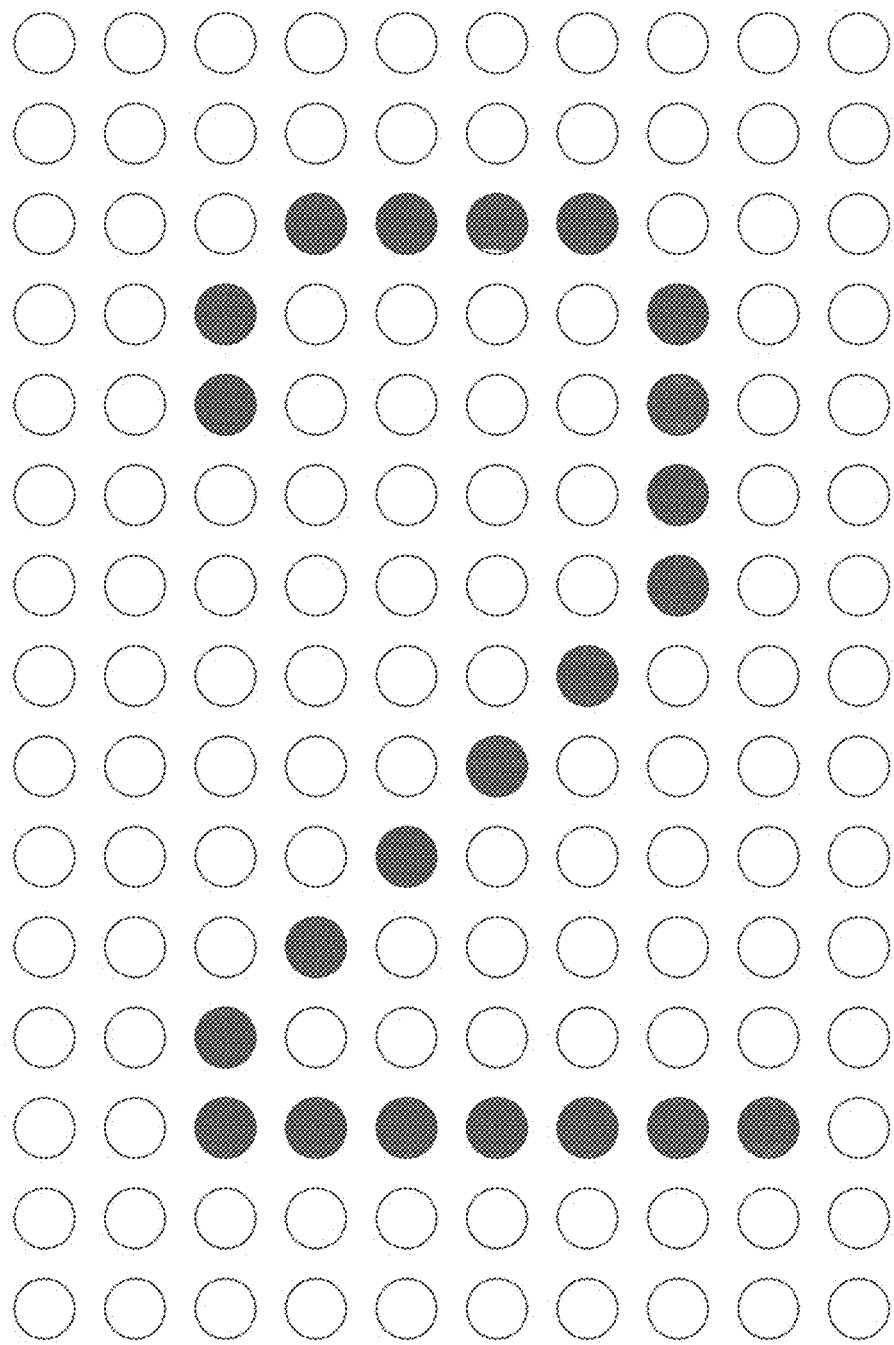
FIG. 14 depicts a top view of a pixel matrix according to an embodiment of the present disclosure.

As shown in FIG. 14, according to an embodiment of the present disclosure, pixel matrix 5000 may be controlled by software that may provide changing pictures and/or video that may be displayed. It should be appreciated that pixel matrix 5000 may provide easily reconfiguring and/or exchanging suction cups to provide different images and/or pictures. It should be appreciated that a memory and a processor may be provided to change pictures and/or video without departing from the present disclosure. It should be appreciated that LEDs may be controlled digitally without departing from the present disclosure.

As shown in FIG. 15, according to an embodiment of the present disclosure, more than one set of suction light devices 203A, 203B may be form a single image and/or visual media. Suction light devices 203A, 203B may form the image and/or visual media without utilizing a cable wire connection. It should be appreciated that sets of suctions light devices may form an unlimited number of patterns without departing from the present disclosure. It should also be appreciated that the sets of suction light devices may form an image and/or visual media that may have a size that may be as large as a size of the structure or building upon which the image and/or visual media is applied.

Figure 16:
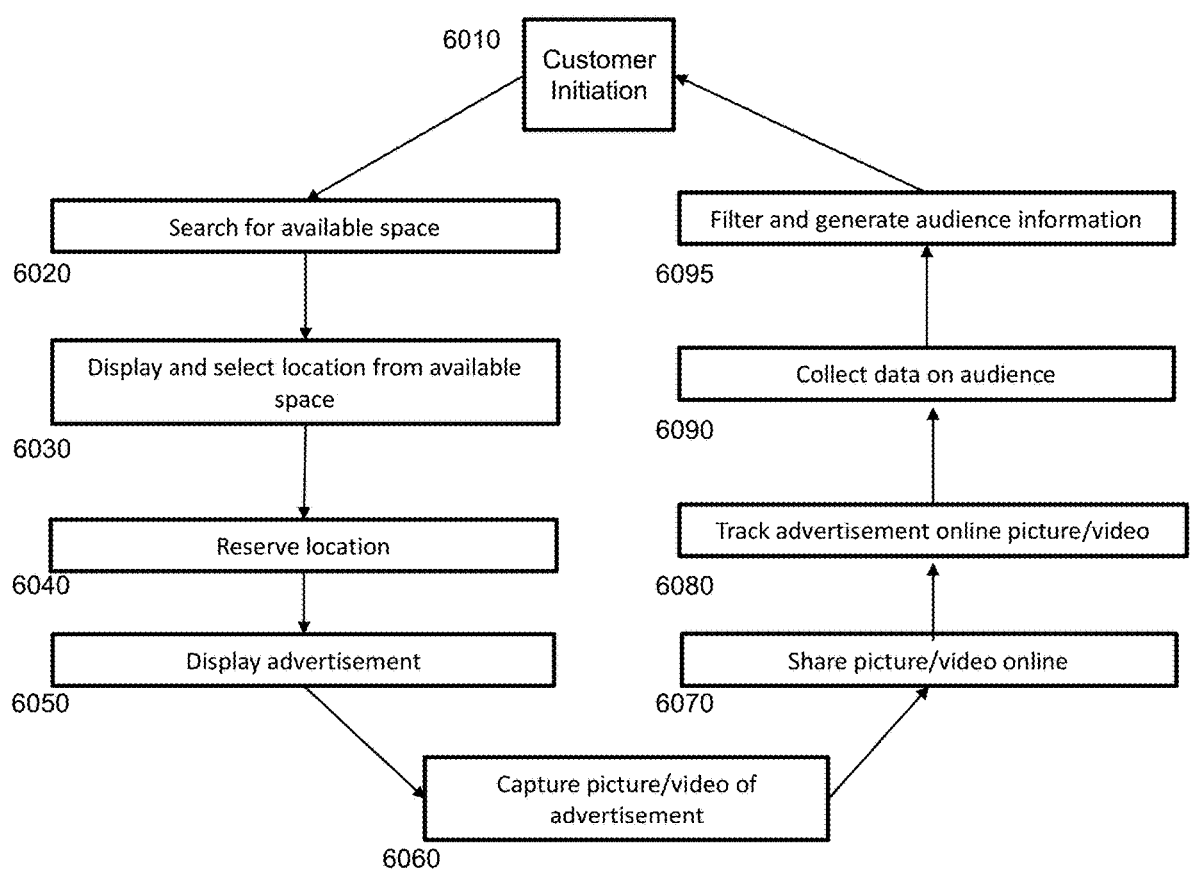
FIG. 16 depicts a method of selecting a location for advertising, display the advertising, and collecting consumer information in connection with the advertising according to an embodiment of the present disclosure.

As shown in FIG. 16, according to an embodiment of the present disclosure, method 6000 may provide a method of advertising on a structure. It should be appreciated that a memory and a processor may be provided to complete each step of method 6000. A user or customer may initiate the method of advertising on a structure by conducting a search (step 6010). The method may provide searching for an available space on a structure (step 6020). It should be appreciated that the search may be based on one or more factors including, but not limited to, location (i.e., city, zip code, neighborhood), structure type, car traffic around the structure, size of space available for advertising, cost to advertise, and time available for advertising to be displayed in embodiments of the present disclosure. It should be appreciated that the available space for a user to reserve may be displayed on a map that may provide a 3D image of the building and surrounding streets. In some embodiments of the present disclosure, a user may employ filters to narrow down the available space based on the one or more factors. The available space may be displayed to a user, and the user may select one or more locations for a set of suction light devices to be installed (step 6030). The location to install the set of suction light devices may be reserved (step 6040). In reserving the location, the user may be prompted to provide one or more items of information including, but not limited to, identification of the desired location, payment information, an image or description of the advertising, and the amount of time for the advertising to be displayed. The set of suction light devices may be installed at the location selected by the user and may display an advertisement or a decorative facade (step 6050). It should be appreciated that prior to installation, the user reserving the location may be provided with a sample or mock-up of how the set of suction light devices will be installed (i.e., colors, movement, positioning) so that the user may approve the installation. It should be appreciated that the set of suction light devices may include LEDs provided in each suction light device. It should be appreciated that LEDs may be controlled digitally without departing from the present disclosure.

In some embodiments of the present disclosure, the advertisement or the decorative facade may be displayed on the side of a building so that it may be visible to pedestrians in the area and/or vehicular traffic around the building. There may be embodiments of the present disclosure where the user who has reserved the location for advertising may wish to evaluate his/her advertising reach. A picture and/or a video may be captured of the set of suction light devices forming the advertisement or the decorative facade (step 6060). It should be appreciated that the audience may capture the picture and/or the video by utilizing a mobile device. The picture and/or the video of the advertisement or the decorative facade may be shared online (step 6070). It should be appreciated that the picture and/or the video may be shared on social media platforms in embodiments of the present disclosure. In some embodiments of the present disclosure, the advertisement or the decorative facade may be tracked by utilizing a tracking code that may be implanted in the set of suction light devices forming the advertisement or the decorative facade that may be captured in the picture and/or the video (step 6080). It should be appreciated that the tracking code that may be implanted into the set of suction light devices may automatically and/or instantaneously transmit, by a processor, information about the audience or individual to a computer or database. It should be appreciated that the tracking code may collect information that may correspond to the audience. Data that may correspond to the advertisement or the decorative facade may be collected in a database by utilizing the tracking code (step 6090). The database may be filtered and may generate sets of information that may correspond to the audience (step 6095). It should be appreciated that the sets of information may be generated and displayed by category.

It should be appreciated that the audience or individual may share the picture and/or video of the set of suction light devices forming an advertising by utilizing an online platform. It should be appreciated that the audience or individual may be rewarded for sharing the picture and/or video on an online platform in some embodiments of the present disclosure. It should further be appreciated that the number of views and/or shares of the picture and/or video may be calculated and advertising data may be gathered. It should be appreciated that the audience and/or individual's personal information may be generated and/or analyzed by category including, but not limited to, age, geographic location, and demographic information. It should further be appreciated that the report may be transmitted to a third-party including, but not limited to, an advertising agency or company's marketing department. It should be appreciated that method 6000 may provide receiving, by the processor, a listing of available space that may be added to a database.

Embodiments of the present disclosure may be useful for various entities including outdoor advertising services, advertising agencies, and building owners having available space for advertising, display installation services. Building owners may employ embodiments of the present disclosure to receive extra income from the window and/or walls of their buildings/structures that have not been previously used for income. Embodiments of the present disclosure also may provide for secondary advertising through online platforms including social media by building a digital watermark (i.e., a secret embedded code that may be tracked online) in an advertising picture or video. An audience may capture a picture or video of the building advertisement or decorative facade and share it online, whether for fun or for reward. Through use of the digital watermark, the effects of advertising may be evaluated online (i.e., how many people viewed the advertisement or the decorative facade, where the people are from that viewed/shared the advertisement or the decorative facade, and the platform(s) where the advertisement or the decorative facade was shared).

It should be appreciated that a plurality of suction light devices may form a sign or display that may be unlimited in size. It should be appreciated that the sign or display may be installed and/or uninstalled in increments.

It should be appreciated that tools, glue, screws, and other materials may not be utilized to install, remove, and maintain the light device. Accordingly, the method of installation may be considered non-destructive as it keeps the structure where the set of suction light devices are installed intact. It should be appreciated that the light device may be the size of one or more windows in a building, the size of the entire building and/or a wall of the building. It should further be appreciated that the light device may not damage a surface. Thus, unlike an outdoor wall wrap, the set of suction light devices may be installed or removed easily from inside of the structure. It should be appreciated that suction light devices 203 may connect a wireless control system that may control playing video. It should be appreciated that suction light devices 203 may operate without a cable wire connection between window-to-window and/or room-to-room sets of suction light devices 203. It should be appreciated that no cable connection may be provided between sets of suctions light devices 203 in embodiments of the present disclosure. It should also be appreciated that suction light devices 203 may provide addressable LED pixels with built-in lens.

It should be appreciated that each suction light device may include a male connector and a female connector that may provide an output and an input, respectively. It should be appreciated that each suction light device may be connected to another suction light device via male and female connectors. It should be appreciated that each individual suction light can be replaced easily for the maintenance. It should be appreciated that each suction light device may include a light controlling chip that may control color, pattern, and speed of light emitted by each device without departing from the present disclosure. It should be appreciated that lighting patterns provided by suction light devices may be unlimited.

There may be embodiments of the present disclosure where a community website may be provided. Products that employ a set of suction light devices can be created by customers, and then customers may use the community website to sell their products. Unlimited lighting patterns may be created in embodiments of the present disclosure. A user may sign onto an online platform or mobile application to create a project that may include a design that could be formed using a set of suction light devices. The project may then be shared through the online platform or mobile application. A product may later be formed based on the project, and either the user who created the project may request that the product be formed or another user on the online platform or mobile application may request the product based on the shared project. Upon request, the product may be formed using the set of suction light devices and then delivered to the requestor.

Figure 17:
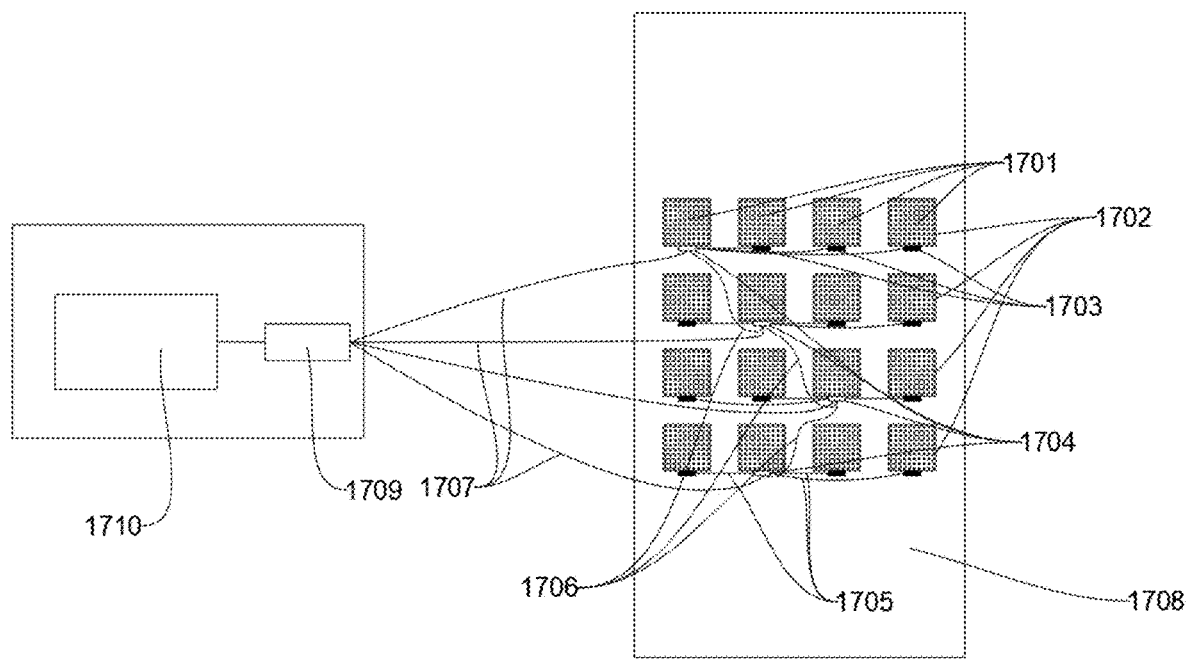
FIG. 17 depicts an architecture view of wireless processing apparatus for image/video splitting, formation and display on building structure according to an embodiment of the present disclosure.

As shown in FIG. 17, according to an embodiment of the present disclosure, a digital image in computer 1710 may be processed by splitter software 1709, then through wireless transmitting 1707 to each processing apparatus 1703, 1704. Each apparatus 1703, 1704 may connect group of lights 1701 attached on window glass 1702 of building 1708. It should be appreciated that all types of apparatus 1703, 1704 may be uniformly made but can be configured to perform different functions. For example, in FIG. 17, apparatus 1703 may be configured to receive data, while apparatus 1704 may be configured to receive and forward data. Wireless transmission 1705 may be used to forward data from apparatus 1704 to apparatus 1703, and wireless transmission 1706 may be used for data exchange between apparatus 1703 and apparatus 1704.

Figure 18:
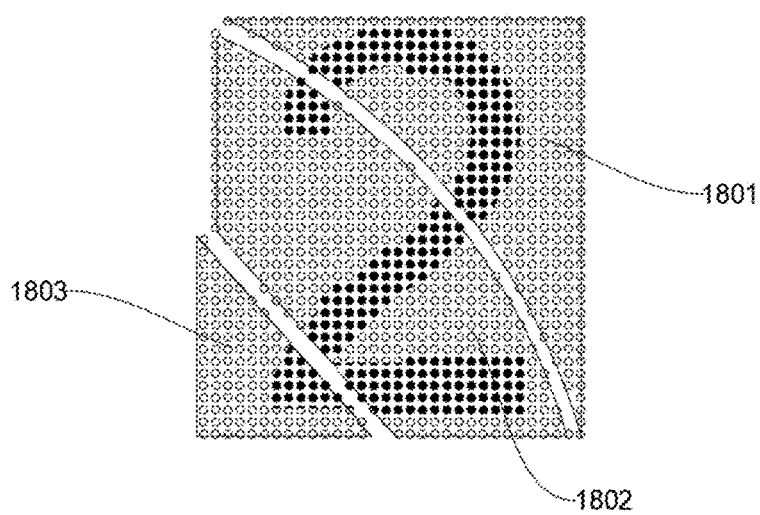
FIG. 18 depicts a method of forming and displaying an integrity image or video from irregular fraction pictures by wireless processing apparatus system.

As shown in FIG. 18, according to an embodiment of the present disclosure, unequal amounts of light groups 1801, 1802, 1803 can be arranged to attach on or to an irregular shape of glass while each apparatus can be configured to control and display its own amount of lights. It should be appreciated that the integrity of an image/video can be formed from more than one irregular picture elements.

The present disclosure is not limited to the embodiments described above. Various changes and modifications can, of course, be made, without departing from the scope and spirit of the present disclosure. For example, dividing and combining of an image or video at a lighting show can be achieved without presenting a physical cabling obstacle. Additional advantages and modifications will readily occur to those skilled in the art. Accordingly, various modifications may be made without departing from the spirit or scope of the general inventive concept as defined by the appended claims and their equivalents.

The invention claimed is:

1. A wireless processing system for image/video splitting, formation, and display on a building structure, the system comprising:
   an image/video splitter; and
   one or more processing apparatus that receive a digital image/video from the image/video splitter using a wireless transmission without cables or wires and are configured to perform one or more functions on the digital image/video,
   wherein one of the one or more processing apparatuses functions as both a master apparatus and a slave apparatus when there is one processing apparatus and wherein one of the one or more processing apparatuses is a master apparatus and one of the one or more processing apparatuses is a slave apparatus when there is more than one processing apparatus,
   wherein the one or more processing apparatuses wirelessly connect without cables or wires at least one group of lights attached on a window glass of the building structure to display the digital image/video, and wherein information is transmitted wirelessly without cables or wires between the master apparatus and the slave apparatus and between two or more slave apparatuses.

2. The system of claim 1, wherein each of the one or more processing apparatuses are uniformly made.

3. The system of claim 1, wherein one of the one or more processing apparatuses is configured as a slave apparatus to receive data.

4. The system of claim 1, wherein one of the one or more processing apparatuses is configured as a master apparatus to receive and forward data.

5. The system of claim 1, wherein the image/video splitter is configured to split the digital image/video into unequal amounts of data for regular or irregular picture elements.

6. The system of claim 1, wherein the image/video splitter is configured to split the digital image/video into equal amounts of data for regular or irregular picture elements.

7. The system of claim 1, wherein the information transmitted wirelessly between the master apparatus and the slave apparatus and between two or more slave apparatuses does not perforate a wall or cause physical damage to a building wall or floor.

8. The system of claim 1, wherein dividing and combining the digital image/video for a lighting show does not present a physical cabling obstacle.

9. The system of claim 1, wherein each of the one or more processing apparatuses accepts content data corresponding to one picture element of the digital image/video for display, wherein each picture element is displayed using a synchronized clock signal as a tag to ensure integrity of the digital image/video.

10. The system of claim 9, wherein the content data corresponding to one picture element is saved to an internal memory of the one or more processing apparatuses.

11. The system of claim 1, wherein the master apparatus sends out a digital clock control signal for each slave apparatus to synchronize the digital clock control signal as a tag.

12. The system of claim 11, wherein each of the slave apparatuses contains a clock that is synchronized to display a content element of each of the slave apparatuses to ensure integrity of the digital image/video that is displayed through the at least one group of lights.

13. The system of claim 1, wherein the number of the one or more processing apparatuses is scalable depending on the size of a display on a structure.

14. The system of claim 1, wherein the slave apparatus receives data and the master apparatus receives and forwards data.

* * * * *